United States Patent
Vlot et al.

(10) Patent No.: US 10,521,564 B2
(45) Date of Patent: Dec. 31, 2019

(54) OPERATING A DEVICE FOR FORWARDING PROTECTED CONTENT TO A CLIENT UNIT

(71) Applicant: Vodafone GmbH, Düsseldorf (DE)

(72) Inventors: Marnix Vlot, Düsseldorf (DE); Christoph Schaaf, Düsseldorf (DE)

(73) Assignee: VODAFONE GMBH (DE)

(*) Notice: Subject to any disclaimer, the term of this patent is extended or adjusted under 35 U.S.C. 154(b) by 0 days.

(21) Appl. No.: 14/836,358

(22) Filed: Aug. 26, 2015

(65) Prior Publication Data

US 2016/0063219 A1     Mar. 3, 2016

(30) Foreign Application Priority Data

Aug. 28, 2014 (EP) .................... 14182728

(51) Int. Cl.
*G06F 21/10* (2013.01)
*G06F 21/44* (2013.01)
*H04L 29/06* (2006.01)

(52) U.S. Cl.
CPC .............. *G06F 21/10* (2013.01); *G06F 21/44* (2013.01); *H04L 63/0464* (2013.01); *G06F 2221/0724* (2013.01)

(58) Field of Classification Search
CPC .......... G06F 21/10; G06F 21/44; G06F 21/57; G06F 21/72; G06F 2221/0773;
(Continued)

(56) References Cited

U.S. PATENT DOCUMENTS

| 9,015,270 B2* | 4/2015 | Cholas | ................ H04L 12/2812 709/217 |
| 2005/0120232 A1* | 6/2005 | Hori | ....................... G06F 21/10 713/193 |

(Continued)

FOREIGN PATENT DOCUMENTS

| EP | 1195734 A1 | 10/2002 |
| WO | 2012047912 A2 | 4/2012 |

OTHER PUBLICATIONS

Mann et al., "ISG ECI: Industry Specification Group on Embedded Common Interface for exchangeable CA/DRM solutions," http://portal.etsi.org/eci/etsi isg eci white paper-v1_20.pdf , Apr. 2, 2014, pp. 1-10.
(Continued)

*Primary Examiner* — Trang T Doan
(74) *Attorney, Agent, or Firm* — Innovation Counsel LLP

(57) ABSTRACT

The invention relates to a method of operating a device for forwarding protected content to a client unit, the device comprising at least one decryption module for decrypting protected content received in the device and at least one re-encryption module for re-encrypting the content to generate re-encrypted content to be sent to the client unit. The method comprises the steps of: (i) the decryption module authenticates the re-encryption module using authentication data transmitted from the re-encryption module to the decryption module, and (ii) the decryption module forwards decrypted content to the re-encryption module upon having successfully authenticated the re-encryption module. Moreover, the invention relates to a corresponding device.

17 Claims, 2 Drawing Sheets

Figure 1:
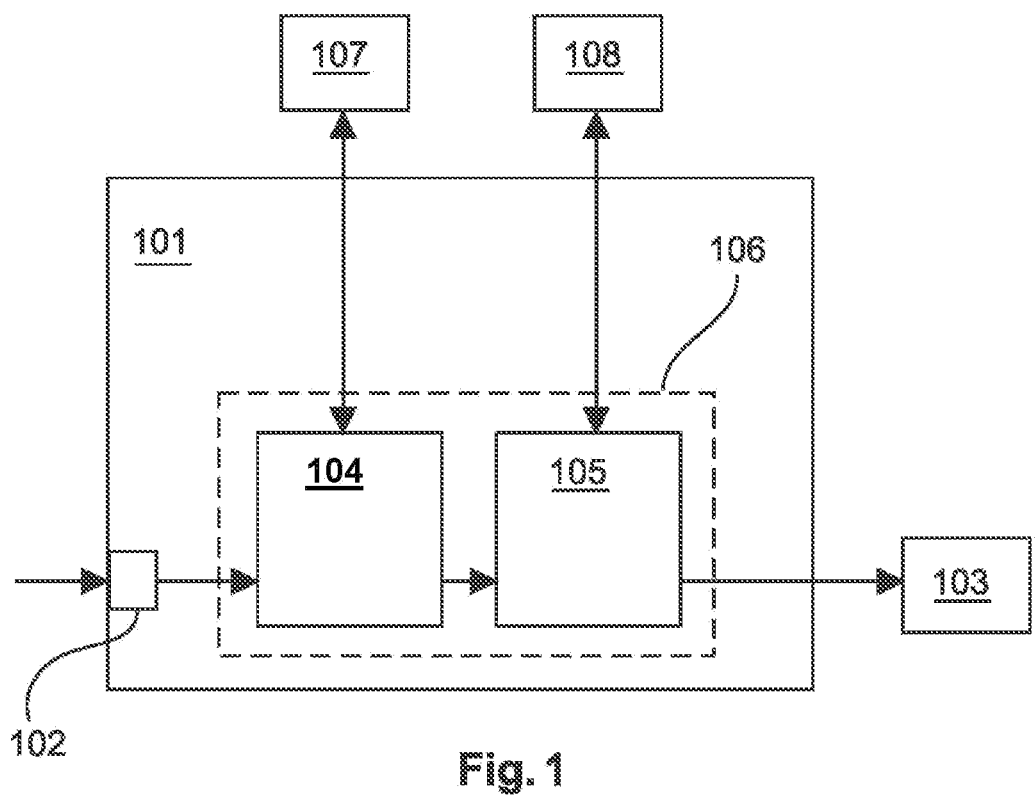

(58) Field of Classification Search
CPC ............... H04L 63/123; H04L 63/0428; H04L 63/0435; H04L 63/0442; H04L 63/0464; H04L 63/062; H04L 63/105
See application file for complete search history.

(56) References Cited

U.S. PATENT DOCUMENTS

| | | | |
|---|---|---|---|
| 2005/0262573 A1 | 11/2005 | Bo et al. | |
| 2006/0015750 A1* | 1/2006 | Ashley | H04N 5/913 713/193 |
| 2006/0168451 A1* | 7/2006 | Ishibashi | G06F 21/10 713/176 |
| 2006/0277598 A1 | 12/2006 | Ahn | |
| 2008/0034421 A1* | 2/2008 | Ahn | G06F 21/10 726/17 |
| 2009/0092248 A1* | 4/2009 | Rawson | G06F 21/31 380/45 |
| 2011/0179267 A1* | 7/2011 | Xie | H04L 63/0227 713/153 |
| 2013/0279694 A1* | 10/2013 | Gremaud | H04N 21/4181 380/211 |
| 2014/0270713 A1* | 9/2014 | Hybertson | H04N 21/4147 386/295 |

OTHER PUBLICATIONS

European Search Report corresponding to EP 14182728, dated Feb. 16, 2015, 1 page.

* cited by examiner

OPERATING A DEVICE FOR FORWARDING PROTECTED CONTENT TO A CLIENT UNIT

CROSS-REFERENCE TO RELATED APPLICATIONS

This application claims benefit of priority to European Patent Application No. EP14182728 filed on Aug. 28, 2014, the entire contents of which is incorporated herein by reference.

The invention relates to content protections system such as CA and/or DRM systems. More specifically, the invention relates to a device for forwarding protected content to a client unit and to a method for operating such a device.

Content protection systems are essential in the area of digital broadcast. In such a system, content is encrypted or scrambled (commonly referred to as encrypted herein) before it is provided to the users of the system, and the users have to decrypt or descramble (commonly referred to as decrypt herein) the content before it can be played back. The cryptographic information, which is necessary for decrypting the content, is provided to authorized users in a secure manner to thereby only allow such users to access and render the protected content. Thus, content providers can control which users can access their content.

For decrypting the protected content, users utilize so-called consumer premises equipment (CPE), such as set-top boxes, special TV sets or the like. Such devices usually comprise secured hardware and software for receiving the decryption information for decrypting the content from the provider and for carrying out the decryption. The decrypted content can be played back using a display unit or other playback unit integrated in the CPE (e.g. if configured as a TV set) or directly coupled to the CPE (e.g. if the CPE is configured as a set-top box). In that far, the play back of the protected content is limited to the playback means pertaining to the primary CPE receiving and decrypting the content. However, users do often dispose of further user devices, which are capable of playing back content but which are not directly coupled to the CPE. Such secondary devices may comprise mobile devices, such as for example, tablet computers or the like, or TV sets which are not directly coupled to the CPE, but which allow for being connected to the CPE through a local area network or through another data connection, for example. Users may also want to play back the protected content using such secondary devices. For this purpose, it would be possible to carry out a further decryption of the protected content for such a secondary device. However, the decryption may require new hardware which may not exist in the secondary device, and it may require a further subscription to the content provider, which the user may wish to avoid.

In this regard, it is known that a primary CPE re-encrypts the content after its decryption and forwards the re-encrypt content to the secondary user device, which decrypts the content for playback (see e.g. WO 2012/047912 A2). The re-encryption is usually made using an encryption scheme which is different from the encryption scheme used by the content provider for protecting the content. Thus, the re-encrypted content can be decrypted in secondary user devices which do not support the encryption scheme originally used for protecting the content by the provider. Moreover, a second subscription to the content provider can be dispensed with for the secondary device. On the other hand, protection of the content and access limitations can be maintained.

In existing CPEs supporting the distribution of re-encrypted content to secondary user devices, the decryption function and the re-encryption function are usually protected by a proprietary mechanism provided by the issuer of the device, which may be the provider of the protected content. While such devices ensure a high level of security, they affect the flexibility for users to change to different content providers and/or use services of more than one content provider. So, a user usually needs a new or an additional CPE, when he changes to another content provider or wants subscribe to services of an additional content provider. This is cumbersome for the user and expensive for the content providers as he has to provide each new user with a device for accessing his services.

Therefore, new user devices have recently been suggested, which are capable of being intend in content protection systems of different content providers. In particular, such devices are disclosed in the white paper "ISG ECI: Industry Specification Group on Embedded Common Interface for exchangeable CA/DRM solutions" which can be retrieved under http://portal.etsi.org/ECUETSI ISG ECI White Paper-v1_20.pdf. The devices may comprise secure functionality for decrypting content of a provider which is configurable to be used in connection with different content providers. This makes it possible to configure the functionality for a new content provider, if the user wishes to subscribe to services of this provider.

It would be desirable that such devices do also comprise functionality for re-encrypting content in order to distribute the content to secondary devices. Moreover, it would be desirable that a content provider can choose whether or not a re-encryption function is activated for this content.

Therefore, it is an object of the present invention to operate a device for decrypting protected content in such a way that functionality for re-encrypting the protected content can be flexibly assigned to the decryption functionality.

This object is achieved by a method according to claim 1 and by a device according to claim 12. Embodiments of the method and the device are given in the dependent claims.

According to a first aspect, the invention suggests a method of operating a device for forwarding protected contents to a client unit, the device comprising at least one decryption module for decrypting protected content received in the device and at least one re-encryption module for re-encrypting the content to generate re-encrypted content to be sent to the client unit. The method comprises the following steps: (i) the decryption module authenticates the re-encryption module using authentication data transmitted from the re-encryption module to the decryption module, and (ii) the decryption module forwards decrypted content to the re-encryption module upon having successfully authenticated the re-encryption module.

According to a further aspect, the invention suggests a device for forwarding protected content to a client unit, the device comprising at least one decryption module for decrypting protected content received in the device and at least one re-encryption module for re-encrypting the content to generate re-encrypted content to be sent to the client unit. The decryption module is configured to authenticate the re-encryption module using authentication data transmitted from the re-encryption module to the decryption module, and the decryption module is further configured to forward the decrypted content to the re-encryption module upon having successfully authenticated the re-encryption module.

It is an advantage of the invention that the forwarding of decrypted content to the re-encryption module requires a successful authentication of the re-encryption module in the decryption module. Thus, it is possible to selectively forward decrypted content only to such re-encryption modules, which can be successfully authenticated in the decryption module. Hence, it can be controlled whether the decryption module forwards decrypted contents to one or more re-encryption modules and to which re-encryption module the decrypted content can be forwarded.

In one embodiment of the method and the device, the decryption module validates the authentication data using verification data provided in the decryption module. A related embodiment provides that the verification data are included in verification information and/or are validated using the verification information, the verification information being provided to the decryption module by a content provider server linked to the decryption module. In these embodiments it is possible for the content provider server to control to which re-encryption modules the decryption module can forward decrypted content by providing respective verification information including verification data for authenticating the re-encryption modules or allowing to validate such verification data. The verification information can preferably be downloaded to the device during its normal use. In case the verification information do not include the verification data, the verification may particularly be included in a digital certificate stored in the user device, and the verification data information may include a validation key for validating this digital certificate.

In a further embodiment of the method and the device, the authentication data are included in and/or are determined from authentication information, the authentication information being provided by a management server linked to the re-encryption module. Thus, it is also possible to download authentication information to the re-encryption module during the normal operation of the device.

Furthermore, one embodiment of the method and the device comprises that the link between the module and the server is established in a predetermined initialization procedure including a communication between the server and the device. In a related embodiment, the initialization procedure comprises transmitting from the server to the device a credential assigned to the server and storing the credential in the module. Preferably, the credential is stored in the module upon a successful validation of the credential using a digital certificate stored in the device. In one embodiment, the credential may include a public key assigned to the respective server.

The aforementioned embodiments preferably apply to the establishment of a link between the content provider server and the decryption module as well as to the establishment of a link between the management server and the re-encryption module. Thus, it is possible to use the same basic mechanism to establish the links between each module and the respective server. Preferably, the link can be established during the normal operation of a device. Thus, it is possible during the normal operation to create a link between the decryption module and a content provider server in order to allow the decryption module to decrypt content of the respective provider. Similarly, it is possible to create a link between a re-encryption module and the management server during the normal operation of the device.

The authentication data for authenticating the re-encryption module in the decryption module may comprise a credential assigned to the management server, which is verified in the decryption module. The credential used for authentication may correspond to the credential, which is also transmitted from the management server to the re-encryption module in order to create the link between these two entities. In such an implementation, the decryption module effectively verifies that the re-encryption module is linked to the management server to which the credential belongs.

In a further embodiment of the method and the device, the re-encryption module generates the authentication data from a credential assigned to the management server and a device identification read from a predetermined memory of the device, the decryption module validating the authentication data using a copy of the credential and the device identification read from the same memory. The credential in this implementation may again comprise a public key assigned to the management server. In this implementation, the credential is combined with the device identification in the authentication data so as to allow the decryption module to verify that the re-encryption module is included in the same device.

In one embodiment of the method and the device, the authentication data includes an identification number or hash value thereof, and the same identification information is included in the verification data provided to the decryption module. Here, the identification information may be uniquely assigned to the device or a certain group of devices. The identification number may be included in the authentication information transmitted from the management server to the re-encryption module. As an alternative, one embodiment of the method and the device provides that the re-encryption module generates the identification number using at least two data elements included in the authentication information transmitted to the re-encryption module by the management server. This embodiment has the advantage that the identification number itself does not have to be transmitted to the re-encryption module. Hereby, the security against tampering can be improved.

Moreover, one embodiment of the method and the device comprises that the re-encryption module generates the authentication data by digitally signing challenge information received from the decryption module using a first cryptographic key received from the management server, and wherein the decryption module verifies the digital signature using a second cryptographic key. The first cryptographic key may be a private key provided to the re-encryption module by the management server, and the second key may be a corresponding public key, where the private and public key form an asymmetric key pair. Further, the second cryptographic key may be included in a digital certificate provided to the decryption module, and the decryption module may validate the digital certificate before it uses the second cryptographic key for authentication the re-encryption module. The challenge information may comprise a random number generated in the decryption module, for example.

In one implementation of the invention, the decryption module and the re-encryption module are in included in a secure hardware environment comprised in the device. The secure hardware environment may be a hardware block which is separated from further hardware of the device and which may comprise a special security architecture for protecting the included data and processes.

Further, the device may comprise a plurality of decryption modules and/or a plurality of re-encryption modules. Thus, it is possible to decrypt protected content of a plurality of content providers, where each decryption module is assigned to one content provider. Moreover, it is possible to forward content via a plurality of re-encryption modules, where each re-encryption module may be assigned to one content protection system. As said above, it is possible to control which decryption module can forwarded decoded content to which re-encryption module by providing the decryption modules with corresponding verification data for authenticating the re-encryption modules.

Figure 2:
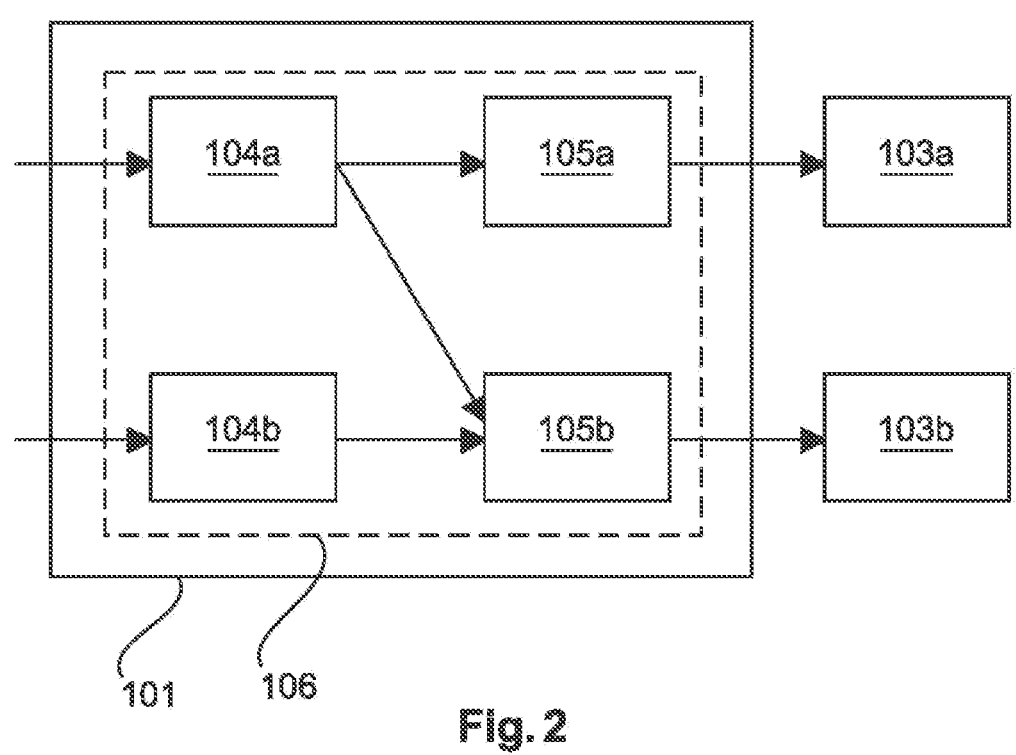
Figure 3A:
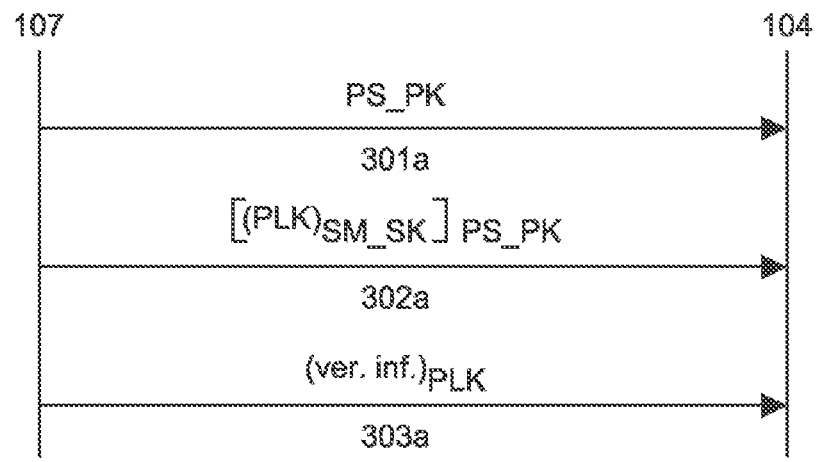
Figure 3B:
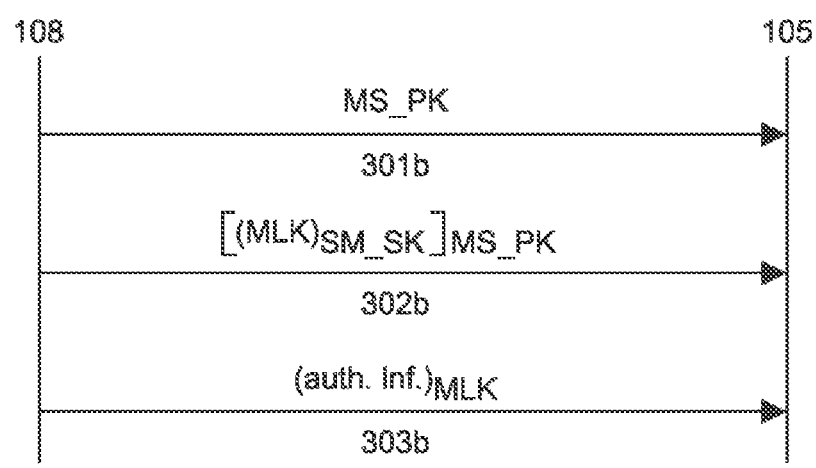

The aforementioned and other aspects of the invention will also be apparent from and elucidated with reference to the embodiments described hereinafter making reference to the drawings in which FIG. 1 is schematic depiction of one embodiment of a device for forwarding protected content to a client unit, FIG. 2 is a schematic depiction of a further embodiment of a device for forwarding protected content to a client unit, FIG. 3a is a schematic illustration of an initialization procedure for establishing a link between a decryption module and a content provider server, and FIG. 3b is a schematic illustration of an initialization procedure for establishing a link between a re-encryption module and a management server.

FIG. 1 shows a user device 101 which is capable of accessing protected content and which may be configured as a set-top box, a module within a TV set or another appropriate consumer premises equipment (CPE). Although only one user device 101 is shown in FIG. 1, the same protected content may also be provided to further user devices 101 which are similarly configured.

The protected content may include audio and/or video programs, such as television programs, movies, pieces of music and the like. It may be transmitted to the user device 101 via a broadcast transmission channel, which may include a satellite broadcast channel, a cable broadcast channel and/or a terrestrial radio broadcast channel. When transmitted via a broadcast channel, the same content is simultaneously transmitted to a plurality of user device 101. In addition or as an alternative to a broadcast transmission, the protected content may be transmitted to the user device 101 individually upon request. In this case, the protect content, may be downloaded to the user device 101 via an Internet Protocol (IP)-based data network, for example.

The protected content is transmitted to the user device 101 in an encrypted and/or scrambled form (commonly referred to as encryption herein). In the user device 101, the protected content is descrambled or decrypted (commonly referred to as decryption herein) using a decryption key which is also referred to as control word. Examples of suitable encryption schemes for protecting the content are the ISO MPEG Common Encryption standard and the Digital Video Broadcast-Common Scrambling Algorithm (DVB-CSA). However, any other suitable encryption scheme known to a person skilled in the art may likewise be applied for protecting the content. The control word may be specified in a message transmitted to the user device 101 by the content provider in addition to the protected content. The message may be transmitted through the same transmission channel as the protected content in the form of a so-called Entitlement Control Message (ECM). In alternative embodiments, the control word may be specified in a message transmitted to the user device 101 via a different transmission channel.

The user device 101 receives the protected content at a reception interface 102 suitable for receiving the content through the used transmission channel. Within the user device 101, the protected content is forwarded to a decryption module 104, which is capable of decrypting the protected content. For this purpose, the control word is provided to the decryption module 104 in addition to the protected content. The control word may likewise be received at the reception interface 102 when transmitted via the same transmission channel as the protected content, or it may be received via another suitable reception interface of the user device 101 when it is transmitted through a separate transmission channel. After the protected content has been decrypted in the decryption module 104, the user device 101 may provide the decrypted content for a direct playback. This process also includes a decoding of the compressed content. For playback, the decrypted content may further be forwarded to a playback unit (not shown in the figures). The playback unit may be a separate device directly coupled to the user device 101 through a suitable cable connection, such as, for example, an HDMI (High-Definition Multimedia Interface) connection. This may particularly be the case when the user device 101 is configured as a set-top box. As an alternative, the user device 101 and the playback unit may be components of an integrated apparatus, such as, for example a TV set. In this case, the decrypted content is forwarded to the playback unit through an appropriate internal connection of the integrated apparatus. The playback unit may particularly include a display unit for outputting audio content and/or loudspeakers or there like for outputting audio content.

Furthermore, the decryption module 104 is capable of providing the content for being accessed by one or more client units 103 (in the following, only one client unit 103 is referred to by way of example). In one embodiment shown in FIG. 1, the client unit 103 may be included in separate client device which is not directly coupled to the user device 101. Rather, the client device may be connected to the user device 101 via a data network. Via the connection to the client device, the content may be directly forwarded to the client device or the content may be buffered in the user device 101 and forwarded to the client device at a later point in time. The latter procedure may be applied, when the client device is not permanently connected to the user device 101, for example. The client device may be configured as a further CPE and/or multimedia device and may access the content in order to render the content using an integrated playback unit or a playback unit coupled to the client device. In particular, the client device may be operated by the user of the user device 101 and may be connected to the user device 101 via local area network likewise operated by the user. Examples of suitable client devices are set-top boxes, TV sets, personal computers and mobile devices, such as notebook and tablet computers.

In addition or as an alternative, the user device 101 is capable of storing received content in a memory and to read the content at a later point in time using a client unit 103 included in the user device 101. The memory used for storing the content may be included in the user device 101 or detachably coupled thereto. In the latter case, the memory may comprise any suitable recording medium. Examples of such a recording medium include a detachable flash drive, a detachable hard disk drive and an optical recording medium. After having stored the content in the memory, the client unit 103 in the user device 101 may access the content at a later time in order render the content by means of the playback unit or to forward the content to one or more separate client devices.

Both aforementioned options, i.e. the forwarding of the content to a client unit 103 included in a separate client device and the storage of the content and the retrieval by means of a client unit 103 included in the user device 101, involve a re-encryption of the protected content in a re-encryption module 105 of the user device 101. Thus, after the decryption unit 103 has decrypted the content, it forwards the content to the re-encryption module 105 which re-encrypts the content before it is forwarded to the client device or the memory. Preferably, the re-encryption is made on the basis of a new control word that differs from the control word used in the decryption module 104 for decrypting the content. In addition, an encryption scheme may be used which is different from the encryption scheme used for protecting the content during transmission to the user device 101.

In order to access the re-encrypted content, each client unit 103 may comprise a client decryption module. For decrypting the re-encrypted content, the client decryption module is provided with the control word, which may e.g. be sent from the re-encryption module 105 to the client decryption module of the client device in addition to the content. During transmission, the control word may be protected using a cryptographic key shared between the re-encryption unit 105 and the client decryption unit. The client decryption module is adapted to the encryption scheme used for the re-encryption. Other than that, the client decryption unit may be configured similarly to the decryption module of the user device 101, which decrypts the content for the first time. Moreover, the client device may likewise be usable as a primary device for accessing protected in addition to its use for decrypting re-encrypted content. In this case, the client device may also dispose of a decryption module 104 for decrypting content received from the provider and an additional client unit including a client decryption module for decrypting re-encrypted content provided by the user device 101. Thus, the user device 101 can securely distribute the content to one or more client devices using a content protection scheme which is independent of the protection scheme used by the content provider to distribute the content to the user device 101.

Similarly, the user device 101 may be configured to securely store the content for future playback. For this purpose, the re-encrypted content generated in the re-encryption unit 105 is stored in the aforementioned memory. In order to access the stored content again, the user device 101 does preferably dispose of similar client decryption module as the client device. This client decryption module decrypts the content and provides the decrypted content for playback. The control word for decrypting the content may be stored together with the content in an encrypted form and read by the client decryption module from the memory. Likewise, it is possible to store the control word separately. In particular, it may be stored in a special file or database managed by the client decryption module, and the client decryption module my access the control word on the basis of a license associated with the content. The encryption and decryption of the control word may again be made on the basis of secret cryptographic key shared between the re-encryption module 105 and the client decryption module.

Preferably, the decryption module 104 and the re-encryption module 105 are included in a secure hardware environment 106 of the user device, which is also referred to as secure hardware block hereinafter. If the user device 101 disposes of a client unit with a client decryption module, this module is preferably also included in the secure hardware block 106.

The secure hardware block 106 is preferably configured as a hardware module that includes a processor and memory for securely executing cryptographic operations and storing data used for carrying out such operations. The secure hardware block 106 is preferably separated from further hardware of the user device 101 including one or more processors and memory units for carrying out other functions of user device 101, which are not directly related to the cryptographic operations executed in the secure hardware block 106 and for storing further data which are not used in the cryptographic operations executed in the secure hardware block 106. In the secure hardware block 106, the operations may be implemented by means of a program code which is securely stored in the memory in such a way that it cannot be read or modified from outside the secure hardware block 106. The program code may be stored in the secure hardware block 106 in a secure manner at the time of its manufacturing. Moreover, the hardware block protects operations executed by the processor from being manipulated from outside the secure hardware block 106, and it ensures that cryptographic data which are used in the operations executed in the secure hardware block 106 and which are stored in the memory of the secure hardware block 106 in addition to the program code cannot be read or modified from outside the secure hardware block 106.

The integration into the secure hardware block 106 particularly ensures that each decryption module 104, re-encryption module 105 and—if available—the client decryption module can only execute defined operations which are included in the program code securely stored in the secure hardware block 106. Moreover, the processes which are carried out in the modules cannot be modified during their execution. Furthermore, the secure hardware block 106 protects the communication between the re-encryption modules 105 and the decryption modules 104 (and vice versa). In particular, it ensures that messages exchanged between these modules within the secure hardware block 106 cannot be manipulated or counterfeited (e.g. by an attacker "impersonating" a re-encryption module 105 or a decryption module 104).

The cryptographic operations executed in the secure hardware block 106 comprise the encryption and decryption of data using respective encryption and decryption keys, and the calculation of digests of data, such as hash values. Such digests may particularly be calculated in order to verify digital signatures. Moreover, the secure module 105 is preferably capable of verifying the authenticity of public cryptographic keys and other data using one or more digital certificates stored in the secure hardware block 106. Such digital certificates include a so-called root digital certificate which may be stored in the secure hardware block 106 in such a way that it cannot be modified. Using the root digital certificate and possible further intermediate digital certificates included in a certificate chain based on the root certificate, the authenticity of data can be verified in a way known to a person skilled in the art. In particular, a digital certificate for certain data may include an encrypted digest of the data, and the encrypted digest may be created using a secret key pertaining to the root digital certificate or a digital certificate in a certificate chain that includes the root digital certificate and one or more further digital certificates. Thus, the public key included in the root digital certificate or the further digital certificate of the certificate chain can be used to decrypt the encrypted digest in order to validate the data. The digest may particularly include a hash value of the data.

Digital certificates provided to the secure module 105 may particularly be issued by a trust authority which manages a number of user devices 101 and which disposes of the secret key pertaining to the root digital certificate and/or to one or more further digital certificates of a chain of trust installed in the secure hardware block 106. The trust authority may particularly issue digital certificates for trusted servers which can control a decryption module 104 or a re-encryption module 105 in a way described herein below. Such a trusted server dispose of a secret key and a public key of an asymmetric key pair assigned to the server. For the public key, the trust authority may issue a digital certificate which can be verified in the secure hardware block 106 using the digital root certificate and possibly one or more intermediate digital certificates stored in the secure hardware block 106.

For establishing a secure data exchange with the secure hardware block 106, an asymmetric key pair including a public and a secret key is preferably also uniquely assigned to the secure hardware block 106. The secret key of the key pair is securely stored in the secure hardware block 106 in such a way that it cannot be modified and/or read from the outside of the secure hardware block 106. The public key can be provided to entities and organizations in order to allow them to communicate with the secure module 105. An entity or organization disposing of the public key of the secure hardware block 106 can particularly generate encrypted messages using the public key which can only be decrypted in the secure hardware block using the secret key.

The cryptographic processes and capabilities of the secure hardware block 106 may be implemented centrally in the secure hardware block 106, and the decryption module 104 and the re-encryption module 105 may access these processes and capabilities when required. However, data which are specific for one decryption module 104 and one re-encryption module 105 may be stored in memory areas and/or registers, which are reserved for the respective module and cannot be accessed by any other module of the secure hardware block 106. This ensures that only the module to which data pertain can use such data within the secure hardware block 106.

Each re-encryption module 105 and preferably also each decryption module 104 provided in the secure hardware block 106 is linked to a server which controls the operation of the module and which may be connected to the user device 101 through a data network, for example. In particular, each decryption module 104 may be linked to a content provider server 107. The content provider 107 may be operated by the provider the content which is decrypted in the decryption module 104. Thus, the content provider 107 has control over the decryption operation executed in the decryption module 104. Each re-encryption module 105 is linked to a management server 108. In principal the management server 108 does not have to be physically different from the content provider server 107. Thus, one single physical server unit may act as the content provider server 107 and the management server 108. This is particularly useful when the provider operating the content provider server 107 also controls the re-encryption module 105. However, the management server 108 may likewise be physically different from the content provider server 107 and by be operated by a different entity. This entity may be the manufacturer of the user device 101 and/or the client devices including the client units 103 so that the manufacturer can control the distribution of content from the user device 101 to one or more client units 103. The same entity that controls the re-encryption module 105 may also control the client units 103 and the data exchange between the re-encryption module and the client units 103.

The link between a module (a decryption module 104 or a re-encryption module) and a server can be established during the operation of the user device 101 after it has been issued to the user. Moreover, a link which has been establishes between a module and server can be deleted again during the operation of the user device 101. In particular, this makes it possible for the user of the user device 101 to subscribe to the services of a new content provider and to use the same user device 101 to decrypt content of the new content provider after the user device 101 has been used to decrypt content of another content provider before. For this purpose, a new link may be established between the decryption module 104 and the provider server operated by the new content provider. Similarly, a link between the re-encryption module 106 and a management server 108 can be established during the operation of the user device 101 at the user's premises, and such link can also be deleted again.

Moreover, it is possible for the user device 101 to access protected content of more than one content provider. For this purpose, several decryption modules 104 may be initialized in the secure hardware block 106, and each decryption module 104 decrypts content of one provider and is linked to a content provider server 107 of the respective content provider. Similarly, the secure hardware block 106 may contain more than one re-encryption module 105. Each re-encryption module 105 may be linked to one management server 108. Thus, different management servers 108 control functionality in the user device 101 for distributing content from the user device 101 to one or more client units 103.

In principal, each decryption module 104 can forward decrypted content to each re-encryption module 105 so that the content is re-encrypted for further distribution by the respective re-encryption module 105. However, a mechanism is provided which allows to control to which re-encryption module 105 a decryption module 104 forwards decrypted content. In accordance with this mechanism, a re-encryption module 105 has to be successfully authenticated in a decryption module 104 before the decryption module 104 forwards decrypted content to the re-encryption module 105. As will be explained in more detail herein below, the authentication is made on the basis of verification data which are provided or specified by the content provider server 107 to which the decryption module 104 is linked. This makes it possible for the content provider server 107 (or the content provider operating the content provider server 107) to choose whether the decryption module 104 can forward decrypted data to one or more re-encryption module 105 and to select the re-encryption modules 105 to which decrypted content is provided.

By way of example, this is further illustrated in FIG. 2 which shows a user device 101 comprising a secure hardware block 106 containing two decryption modules 104*a,b* and two re-encryption modules 105*a,b*.

In the situation depicted in FIG. 2, the decryption module 104*a* disposes of valid verification data for authenticating both re-encryption modules 105*a* and 105*b*. Thus, decrypted content can be forwarded from the decryption module 104*a* to both re-encryption modules 105*a* and 105*b*. The re-encryption module 105*a* can provide the re-encrypted content to one or more client units 103*a*, one of which is shown in FIG. 2 by way of example. Similarly, the re-encryption module 105*b* can forward re-encrypted content to one or more client units 103*b* one of which is shown in FIG. 2 by way of example (here, the person skilled in the art will understand that the group of client units represented by the client unit 103*a* and the group represented by the client unit 103*b* may overlap or correspond to each other). In contrast to the decryption module 104*a*, the decryption module 104*b* only disposes of verification data for authenticating the re-encryption module 1045. Thus, content decrypted in decryption module 104*b* can only be forwarded to the re-encryption module 105*b* and not to the re-encryption module 105*a*.

As said above, the configuration shown in FIG. 2 is merely to be understood as an illustrative example. Likewise, the user device 101 may comprise a different number of decryption modules 104 and/or re-encryption modules 105, and the authentication relation between the decryption modules 104 and the re-encryption module 105 may be different than illustrated in FIG. 2.

The link between a content provider server 107 and a decryption module 104 on the one hand and between a management server 108 and a re-encryption module 105 on the other hand is established in an initialization procedure. Preferably, the initialization procedure is carried out in an analog way for establishing the link between each module and the respective server. In the initialization procedure, the server sends a credential to the respective module. The module validates the credential, and upon a successful validation of the credential, the credential is stored in the module. Due to the storage of the credential in the module, the server has "taken possession" of the module, i.e. the module is linked to the server. During the further communication between the server and the module, information used in the authentication procedure between the decryption modules 104 and the re-encryption modules can be transmitted to the respective module. In case of a re-encryption module 105, this information comprises authentication information, which includes authentication data to be transmitted from the re-encryption module 105 to a decryption module 106 or which is used in the re-encryption module 105 to generate the authentication data. In case of a decryption module 104, the information is referred to as verification information herein and includes or specifies verification data which are used by the decryption module 104 to verify authentication data received from a re-encryption module 105.

Embodiments of the authentication mechanism will be explained in more detail herein below after a description of the initialization procedure, which is provided in the following by making reference to FIGS. 3a and 3b. While FIG. 3a illustrates the initialization procedure for establishing a link between a content provider server 107 and a decryption module 104, FIG. 3b illustrates the initialization procedure for establishing a link between a management server 108 and a re-encryption module 105. As the person skilled in the art will appreciate from FIGS. 3a and 3b, there is a parallelism between these initialization procedures in that the same kind of information is used in both procedures in a similar way.

In FIGS. 3a and 3b, encryption of data is indicated by means of parenthesis, and a subscript indicates the key which can be used for decrypting the data. Thus, the expression $(D)_x$ denotes that data D is encrypted in such a way that it can be decrypted using the cryptographic key x. Moreover, square brackets indicate that data is provided with a digital signature, and the subscript specifies the key that can be used for verifying the digital signature. Hence, the expression $[D]_x$ refers to data D provided with the digital signature that can be validated using the public cryptographic key x.

In a first step of the link initialization procedure, the server sends a credential to the module, which puts the module into a position to authenticate the server. For this authentication, the module uses a digital certificate which may have been issued by the trust authority. Hereby, it can be established that the server or its operator has been certified by the trust authority and, thus, is a "trusted entity". In one embodiment, the credential is a public key assigned to the respective server. Thus, the content provider server 107 sends its public key PS_PK to the decryption module 104 (step 301a), and the management server 108 sends its public key MS_PK to the re-encryption module 105 (step 301b). The respective module authenticates the received public key using a digital certificate stored in the secure hardware block 106. This digital certificate may be the root digital certificate, or it may be included in a chain of trust based on the root certificate. Thus, the decryption module 104 authenticates the public key PS_PK received from the content provider server 107, and the re-encryption module 105 authenticates the public key MS_PK received from the management server 108 using a corresponding digital certificate stored in the secure hardware block 106. Upon a successful validation, the respective module stores the received public key.

When this step is completed successfully, an initial link is established between the module and the server. Thereupon, messages transmitted from the server to the assigned module will be directly or indirectly validated on the basis of the stored public key. This means, that it is not possible for another server to transmit valid messages to the module after the establishment of the initial link. In particular, it is not possible for another server to transmit valid authentication information to the re-encryption module 104, and it is not possible for another server to transmit valid verification information to the decryption module 104. Thus, the operation of the modules including their interaction can be indirectly controlled by the servers linked to the modules.

In one embodiment, the authentication data transmitted from the re-encryption module 105 to the decryption module 104 correspond to/or are derived from the public key MS_PK of the management server 108. In this embodiment, it is not necessary for the management server 108 to transmit further authentication information to the re-encryption module 105.

However, in preferred embodiments, the authentication information is different from the public key MS_PK or may include additional information. In such embodiments, the authentication information is transmitted to the re-encryption module 105 in a secure manner which prevents that unauthorized third parties can send valid authentication information. For this purpose, it is possible to provide the authentication information with a digital signature created using a secret key of the management server 108 so that the re-encryption module 105 can validate the digital signature using the public key MS_PK of the management server 108 stored in the re-encryption module 105. In this case, the re-encryption module 105 uses the authentication information only in case it has successfully validated the digital signature. In addition, the management server 108 may encrypt the authentication information using the public key of the secure hardware block 106, and the re-encryption module 105 may decrypt the authentication information using the secret key of the secure hardware block 106.

In an alternative embodiment illustrated in FIG. 3b, the authentication information is protected using a cryptographic link key MLK which is previously installed in the re-encryption module 105 and which is preferably configured as a symmetric cryptographic key. The link key MLK may be generated in the management server 108 and a copy thereof may then be securely transmitted to the re-encryption module 105. For this purpose, the management server 108 may encrypt a copy of the link key MLK using the public key of the secure hardware block 106 which has been provided to the management server 108 before. Thus, the re-encryption module 105 can decrypt the link key MLK using the secret key SM_SK pertaining to the secure hardware block 106. Further, the management server 108 provides the encrypted link key MLK with a digital signature created using its secret key. Thus, the re-encryption module 105 can validate the digital signature using the public key MS_PK of the management server 108 stored therein. The link key MLK which is protected in such a way is transmitted to the re-encryption module 105 in step 302b. Upon receipt of the protected link key, the re-encryption module 105 validates the digital signature and decrypts the link key MLK, and, upon a successful completion of these tasks, the re-encryption module 105 stores the link key MLK for future use.

In the next step, the management server 108 may encrypt the authentication information (auth.inf.) using the link key MLK and may transmit the encrypted authentication information to the re-encryption module 105 as illustrated in FIG. 3b (see step 303b). Upon receipt of this data, the re-encryption module 105 decrypts the authentication information using the copy of the link key MLK stored therein. When the authentication information is protected by means of the link key MLK, it can be implicitly verified by decrypting the authentication information using the link key MLK that the authentication information originates from the management server 108 which has installed its public key MS_PK in the re-encryption module 105 before. In other words, the re-encryption module 105 does indirectly verify that the management server 108 is the source of the authentication information on the basis of the stored public key MS_PK.

Similar to the transmission of the authentication information from the management server 108 to the re-encryption module 105, verification information, which include or allow for validating the verification data used in the decryption module 104 for authenticating the re-encryption module 105, may be transmitted from the content provider server 107 to the decryption module 104. In particular, the content provider server 107 may provide the verification information with a digital signature created using a secret key of the content provider server 107 so that the decryption module 105 can validate the digital signature using the public key PS_PK of the provider server 108 stored in the decryption module 105. In this case, the re-encryption module 105 uses the authentication information only in case it has successfully validated the digital signature. In addition, the content provider server 107 may encrypt the verification information using the public key of the secure hardware block 106, and the decryption module 105 may decrypt the verification information using the secret key of the secure hardware block 106. Encryption is particularly useful, when secret information, such as a secret key, are included the verification information. If no secret information is included in the verification information, the encryption can be dispensed with. Only authentication may be performed. This is particularly the case when the verification information comprises a public key. Moreover, as will be described in more detail below, the verification information may comprise a hash value of a secret key (in particular a hash value of the link key MLK). Also in this case, encryption can be dispensed with, because the hash value cannot be used for decrypting data encrypted with the respective key.

Or, as an alternative illustrated in FIG. 3a, the content provider server 107 may provide a link key PLK to the decryption module 104 in a similar way as the management server 108 provides the link key MLK to the re-encryption module 105. Thus, the content provider server 107 may encrypt the link key PLK using the public key of the secure hardware block 106 so that the decryption module 104 can decrypt the link key PLK using secret key SM_SK of the secure hardware block 106. Further, the content provider server 107 provides the link key PLK with a digital signature created using its secret key so that the digital signature can be verified using the public key PS_PK of the content provider server 107 stored in the decryption module 104. Then, the link key which is protected in such a way is transmitted from the content provider server 107 to the decryption module 104 in step 302a shown in FIG. 3a. Upon a successful decryption of the link key PLK using the secure key of the secure hardware block 106, the decryption module 104 stores the link key PLK for future use. As the link key MLK for securing the communication between management server 108 and the re-encryption module 105, the link key PLK is preferably a symmetric key. Then, the content provider server 107 uses its copy of the link key PLK to encrypt the verification information (ver.inf.) which is send to the decryption module 104 (see step 303a in FIG. 3a), and the decryption module 104 uses the copy of the link key PLK stored therein to decrypt the received verification information. Upon a successful decryption of the verification information, the verification information is stored in the decryption module 104. As an alternative, the verification information is encrypted using the link key PLK, but the content provider server 107 transmits the verification information together with a digital signature or message authentication code (MAC) generated using the link key PLK. In this implementation the decryption module 104 validates the digital signature or MAC and stores the verification When the verification information are provided to the decryption module 104 by the content provider server 107 in a way described above, the content provider server 107 can control which re-encryption module(s) 105 can successfully be authenticated by the decryption module 104.

As will be described herein below, the verification data for authenticating a re-encryption module 105 may comprise a public key and/or identification information. In one embodiment, these verification data are included in the verification information transmitted from the content provider server 107 to the decryption module 105 and stored in the decryption module 105 upon receipt. In further embodiments, the verification data are included in one or more digital certificates. In these embodiments, the decryption module 104 only uses the verification data after they have been successfully validated using a validation key. The verification information include the validation key, in there embodiments. The validation key is selected by the content provider and may be provided to the decryption module by the content provider server 107. In particular, the validation key may be provided to the decryption module 104 by the content provider server 107 through the secure link previously created in the initialization procedure. The validation key may be directly used for validating the verification data, or the verification data may be validated using a certificate chain including the validation key as a basis. Thus, the verification data are included in the last digital certificate of a certificate chain including the validation key.

The digital certificate for the validating the authentication data and required intermediate digital certificates do not have to be provided to the decryption module via the secure link to the content provider server 107 (although this is possible). Rather, they can be provided to the secure hardware block 106 via a different channel and stored therein. Then, the decryption module 106 may access the digital certificates when a re-encryption unit 105 is to be authenticated. In one exemplary embodiment, the verification data may be provided by the management server 108 to the secure module 108 in connection with the initialization procedure for the re-encryption module 105. Further, the digital certificates included in the verification data may be created (i.e. digitally signed) by the content provider using a secret key pertaining to the validation key.

The authentication of a re-encryption module 105 by a decryption module 104 may be made during the initialization of the user device 101 which is executed when the user device 101 is turned on. During this initialization phase, each re-encryption module 105 may transmit authentication data to every decryption module 105 in the secure hardware block 106. Upon a successful authentication of a re-encryption module 105 on the basis of these data in a decryption module 105, the decryption module 104 may then be enabled to forward decrypted content to the re-encryption module 105. The successful authentication may be valid until the user device 101 is turned off again. This means that decryption module(s) 104 authenticate the re-encryption module(s) 105 again after the next start of the user device 101. Moreover, a successful authentication may lose effect upon a reconfiguration of the decryption module 105 and/or the re-encryption module 105. Such a reconfiguration may include the deletion of an existing link between the decryption module 104 and content provider server 107 and/or the deletion of a link between the re-encryption module 105 and a management server 108. Such reconfiguration is recognized in the secure hardware block 106, and the function for recognizing such a reconfiguration notifies the other modules correspondingly. If a decryption module 104 receives such a notification with respect to a re-encryption module 105, it stops transmitting decrypted content to this re-encryption module 105.

In a further embodiment, the authentication of a re-encryption module 105 may be made, when the user device 101 receives an instruction to forward re-encrypted content utilizing a certain re-encryption module 105 or to store re-encrypted content in the memory. Such instruction may be given by the user of the user device 101 by means of an appropriate input means. Upon receipt of the instruction, the decryption module 104 used for decrypting the relevant content, may authenticate the re-encryption module 105 which would be used for re-encrypting the content in accordance with the user instruction. Upon a successful authentication of the re-encryption module, the decryption module 104 may forward the decrypted content to this re-encryption module. If the authentication fails, the content is not forwarded to this re-encryption module 105.

In the following, some embodiments of the authentication of a re-encryption module 105 in one decryption module 104 will now be described by way of example.

As already explained above, one embodiment provides that the authentication of a re-encryption module 105 is made on the basis of the public key MS_PK stored and the re-encryption module 105. In this embodiment, the re-encryption module 105 forwards the public key MS_PK to the decryption module 104. Alternatively, the re-encryption module 105 may generate a hash value of the public key MS_PK and forward the hash value to the decryption module 105. The hash value may be calculated using any hash algorithm know to the person skilled in the art; one hash algorithm which may be applied for this purpose is the known SHA-256 algorithm. The public key MS_PK or the hash value thereof is transmitted to the decryption module 104.

The verification data used in the decryption module 104 for authenticating the re-encryption module 105 in this embodiment include a copy of the public key MS_PK or the hash value thereof (if the authentication data comprise such a hash value). As described above, the public key or the hash value thereof may be transmitted from the content provider server 107 to the decryption module 104 for this purpose. Here, the data amount of the verification data sent by the provider server 107 can be reduced, when the hash value is used instead of the public key. Or, the content provider server 107 may specify a digital certificate for the public key MS_PK or a further digital certificate for verifying the certificate for the key MS_PK as a valid certificate for authenticating the re-encryption module 105. In the latter case, the same certificate can be used for verifying the public key MS_PK which has previously been used in the initialization procedure.

The authentication of the re-encryption module 105 is successfully completed, if the public key MS_PK corresponds to the copy of the public key MS_PK used as verification data. In case the authentication data received from the re-encryption module 105 include a hash value of the public key MS_PK, the decryption module 104 generates a hash value of the public key included in the relevant digital certificate using the same hash algorithm. If the received hash value and the hash value generated in the decryption module 104 correspond to each other, the authentication procedure is completed successfully.

In the aforementioned embodiment, the decryption module 104 effectively validates whether the re-encryption module 105 is linked to the management server 108 to which the public key MS_PK is assigned. In a variant of this embodiment, the authentication may be made on the basis of another key associated with the management server 108 or a hash value of this key. In particular, the authentication may be made on the basis of the link key, for example.

Moreover, in a further variant of the aforementioned embodiment, it is additionally verified whether the re-encryption module 105 and the decryption module 104 are included in a device which is unlocked for the re-encryption of content for the provider to which the decryption module 104 is assigned. In this embodiment, unique device IDs may be assigned to the user devices 101, and the device ID of each user device 101 may be stored in the user device 101, particularly in its secure hardware block 106. Further, the verification data provided in the decryption module 104 may specify unlocked devices 101 by means of their device IDs. Thus, the verification data may include a list of device IDs of unlocked devices 101. Again, this list may be provided to the decryption module by the content provider server 107 as explained above, or it may be included in a digital certificate which is validated using the validation key provided by the content provider.

Using these verification data, the decryption module 104 checks whether it is comprised in an unlocked device 101. Only in this case, it can successfully authenticate a re-encryption module 105. For this purpose, the decryption module 105 may read the device ID which may be stored in a predetermined memory location in the secure hardware block 106 and may check whether the read device ID corresponds to one device ID included in the verification data. This check may be made before the decryption module 104 receives the authentication data from the re-encryption module 106. In this case, the authentication procedure is terminated unsuccessfully, if the decryption module 205 ascertains that the read device ID does not correspond to a valid device ID included in the verification information. Otherwise, the decryption module 104 proceeds with the validation of the authentication data received from the re-encryption module 105. These authentication data may correspond to the public key MS_PK or a hash value thereof as described above, and they may be validated in the same way as described above.

Likewise, the authentication data may be generated in the re-encryption module 105 on the basis of the device ID. In particular, the authentication data may be generated on the basis of the public key MS_PK and the device ID. In this implementation, the re-encryption module 105 reads device ID from the predetermined memory location and combines the device ID with the public key MS_PK in accordance with a predetermined algorithm. This algorithm may include the generation of a hash value of a concatenation of the public key MS_PK of the management server 108 and the device ID, for example. In the decryption module 104, these authentication data are validated using a copy of the public key MS_PK which may be provided to the decryption module 104 and validated in the decryption module 104 in the same way as in the embodiment described above. In addition, the validation is made on the basis of the device ID. So, when it receives the authentication data, the decryption module 104 reads the public key and the device ID, where the public key may be identified in additional information accompanying the authentication data (e.g. by an identification number of the public key or the digital certificate including the public key which is transmitted to the decryption module 104 together with the authentication data). Then, the decryption module 104 calculates a combination of the read public key and the device ID using the same algorithm, which has been used in the re-encryption module 105 in order to generate the authentication data. Thereupon, the decryption module 104 checks whether the result of the calculation corresponds to the received authentication data. Moreover, the decryption module 104 may check whether the device ID is included in the verification information received from the content provider server. In case both checks lead to an affirmative result, the authentication of the re-encryption module 105 is completed successfully. Otherwise the authentication is terminated unsuccessfully.

In further embodiments of the authentication procedure, the authentication information provided by the management server 107 include identification data which are specific to the user device 101 (i.e. the identification data are exclusively used in this user device 101) or which are specific to a certain group of user devices 101 which can be defined by the management server 108 or its operator according to any suitable criterion.

In particular, the management server 101 may generate an identification number for the user device 101 or for a group of user devices including the user device 101 and may transmit the identification number to the re-encryption module 105 as authentication information. The same identification number is provided in the decryption module 104 as verification data. For this purpose, the identification number may also be provided to the content provider server 107, and the content provider 107 may transmit the identification number to the decryption module 104 in the initialization procedure described above, if the content provider wants to allow a forwarding of decrypted content to the re-encryption module 105. As an alternative, a digital certificate including the identification number may be provided to the secure hardware block 106, and may be in the decryption module 104 using the validation key as explained above.

Similar to the embodiment involving the device ID, this embodiment does particularly allow to provide verification data including a list of valid identification numbers, and this list may used in a plurality of decryption modules 104 controlled by the content provider server 107. This list may include the identification numbers assigned to the user devices 101 for which the content provider allows the forwarding of decrypted content from the decryption module 104 to one or more re-encryption modules 105. This makes is possible to unlock the forwarding individually for selected user devices 102 without having to send individual messages to these user devices 101.

In this embodiment, the authentication procedure for the re-encryption module 105 comprises the transmission of the identification number from the re-encryption module 105 to the decryption module 104. Upon receipt of the identification number, the decryption module 104 compares the received identification number with the identification numbers included in the verification data. In case the received identification number corresponds to one identification number comprised in the verification data, the authentication of the re-encryption module 105 is completed successfully.

A further implementation of the authentication procedure differs from the aforementioned embodiment in that the identification number is not provided to the re-encryption module 105 and "only" forwarded by the re-encryption module 105 to the decryption module 104. Rather, the identification number is generated in the re-encryption module 105 on the basis of the authentication information transmitted from the management server 108 to the re-encryption module 105 in the initialization procedure. In this case, the authentication information may particularly comprise secret information, such as a secret key, and an identification string. The secret key and the identification string may be selected such that the authentication information is specific for the re-encryption module 105. For this purpose, an individual identification string may be used, while the same secret key may be used in a plurality of re-encryption modules 105 controlled by the same management server 108. On the basis of the secret information and the identification string, the re-encryption module 105 may calculate the authentication data using a predetermined algorithm combining the two pieces of data. The algorithm may comprise an encryption of the identification string by means of the secret information and/or the calculation of a hash value of certain combination of the secret information and the identification string. Such combination may be generated by concatenating both pieces of data or by the aforementioned encryption of the identification string.

On the basis of the secret key and the identification string, the management server 108 does also calculate the same authentication data as the re-encryption module 105. The result of this calculation, i.e. the authentication data, is provided in the decryption module 104 as verification data in the same way as the identification number in the embodiment described above through the secure link to the content provider server 107 or within in a digital certificate. In the process of authenticating the re-encryption module 105, the decryption module 104 compares this verification data with the authentication data received from the re-encryption module 105. If both data correspond to each other, the authentication of the re-encryption module 105 is completed successfully.

It is an advantage of this embodiment that the authentication information, i.e. the secret key and the identification string, do only have to be transmitted from the management server 108 to the re-encryption module 105 in a secure communication during the initialization procedure. It is not necessary to uncover the authentication information to third parties including the content provider server 107. This reduces the potential risk that the authentication information are uncovered by unauthorized third parties which could try to install the authentication data in a re-encryption module 105 in the user device in a fraudulent intent. Furthermore, it is to be noted that also in this embodiment the security against tampering is particularly achieved in that the re-encryption module(s) 105 included in the secure hardware block 106 can only behave in the predetermined way described above. Thus, authentication data which are sent to a decryption module 104 can only be generated using the predetermined algorithm for combining the secure key and the identification string; it is not possible to provide the authentication data in another way. In particular, it is not possible for an attacker to install a copy of the result of this calculation in a re-encryption module 105 and to cause the re-encryption module 105 to provide this copy to the decryption module 104 as authentication data without carrying out the aforementioned calculation.

In a further embodiment of the authentication procedure, the authentication information provided from the management server 108 to the re-encryption module 105 likewise includes a secret key. This secret key may be uniquely assigned to the user device 101, or it may be provided to several user devices 101. In this implementation, the secret key is one part of an asymmetric key pair which also includes a public key pertaining to the secret key. This public key is provided to the decryption module 104 in the way already described above.

In first step of the authentication procedure according to this implementation, the decryption module 104 generates a random challenge and sends the random challenge to the re-encryption module 105. The random challenge may include a random number generated in the decryption module 104. The re-encryption module 105 encrypts the random challenge using the secret key installed therein during the initialization procedure, and returns the encrypted random challenge to the decryption module 104. Upon receipt of the encrypted random challenge, the decryption module 104 decrypts the random challenge using the public key provided therein as verification data, and the decryption module 104 compares the decrypted random challenge with the previously generated random challenge, which is stored in the decryption module 104 for this purpose. If both random challenges correspond to each other, the authentication of the re-encryption module 105 is successful. Otherwise, the authentication procedure is completed unsuccessfully.

This implementation does also have the advantage that the authentication information comprises a secret key which is transmitted from the management server 108 to the re-encryption module 105 and which is not revealed to any third party including the content provider server 107 and/or the decryption module 104. Therefore, the security against tampering is improved in this implementation. On the other hand, this implementation requires a relatively complex processing of data including the generation of the random challenge and its decryption in the decryption module 104 so that the complexity of the decryption module 104 is increased compared with the embodiments described above.

In a further variant of the authentication procedure, the aforementioned embodiment that uses a challenge response protocol may be combined with one of the embodiments described above. So, it may be provided that the re-encryption module 105 does not only encrypt the random challenge received from the decryption module 104, but that a combination of the random challenge and further information received from the management server 108 in the initialization procedure, such as an identification number, may be encrypted. When the decryption module 104 decrypts the authentication data it may not only check whether the decrypted random challenge corresponds to the random challenge previously generated in the decryption module 104 but may also verify the additional data which have been decrypted in the decryption module 104 together with the random challenge. The validation of this additional information may be made in the same way as described above using corresponding verification data provided to the decryption module 104.

Upon having successfully authenticated the re-encryption module 104 in accordance with one of the authentication procedures described above, the decryption module 104 forwards decrypted content to the re-encryption module 105. For decrypting the content, the decryption module uses a control word which may be provided to the decryption module 104 in a suitable way. In one embodiment, the content provider may transmit the control word to the user device 101 in a protected form in a manner which is known to a person skilled in the art as such. In the user device 101, the control word may be received by a software application which may be executed outside of the secure hardware block 106 in another processor of the user device 101. This application may decrypt the protected control word and may forward the control word to the decryption module 104. For this purpose, the application may re-encrypt the control word in such a way that the decryption module 104 can decrypt the control word using the link key PLK installed therein in a initialization procedure or another link key transmitted to the decryption module 104 from the content provider server 104 in way similar as the link key PLK. This embodiment has the advantage that the secure link between the content provider server 107 and the decryption module 104 established in the initialization procedure can also be used for securely forwarding the control word to the decryption module 104.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

Various embodiments are described in the following clauses.

1. Method of operating a device for forwarding protected content to a client unit, the device comprising at least one decryption module for decrypting protected content received in the device and at least one re-encryption module for re-encrypting the content to generate re-encrypted content to be sent to the client unit, wherein the method comprises the following steps:
the decryption module authenticates the re-encryption module using authentication data transmitted from the re-encryption module to the decryption module, and
the decryption module forwards decrypted content to the re-encryption module upon having successfully authenticated the re-encryption module.

2. Method as in clause 1, wherein the decryption module validates the authentication data using verification data provided in the decryption module.
3. Method as in clause 2, wherein the verification data are included in verification information and/or are validated using the verification information, the verification information being provided to the decryption module by a content provider server linked to the decryption module.
4. Method according to one of the preceding clauses, wherein the authentication data are included in and/or are determined from authentication information, the authentication information being provided by a management server linked to the re-encryption module.
5. Method as in clause 3 or 4, wherein the link between the module and the server is established in a predetermined initialization procedure including a communication between the server and the device.
6. Method as in clause 5, wherein the initialization procedure comprises transmitting from the server to the device a credential assigned to the server and storing the credential in the module.
7. Method as in clause 6, wherein the credential is stored in the module upon a successful validation of the credential using a digital certificate stored in the device.
8. Method according to one of the preceding clauses, wherein the re-encryption module generates the authentication data from a credential assigned to the management server and a device identification read from a predetermined memory of the device, the decryption module validating the authentication data using a copy of the credential and the device identification read from the same memory.
9. Method according to one of the preceding clauses, wherein the authentication data include an identification number or a hash value thereof, and wherein the same identification information is included in the verification data provided to the decryption module.
10. Method as in clause 9, wherein re-encryption module generates the identification number using at least two data elements included in the authentication information transmitted to the re-encryption module by the management server.
11. Method according to one of the preceding clauses, wherein the re-encryption module generates the authentication data by digitally signing challenge information received from the decryption module using a first cryptographic key received from the management server, and wherein the decryption module verifies the digital signature using a second cryptographic key.
12. Device for forwarding protected content to a client unit, the device comprising at least one decryption module for decrypting protected content received in the device and at least one re-encryption module for re-encrypting the content to generate re-encrypted content to be sent to the client unit,
wherein the decryption module is configured to authenticate the re-encryption module using authentication data transmitted from the re-encryption module to the decryption module, and
the decryption module is configured to forward the decrypted content to the re-encryption module upon having successfully authenticated the re-encryption module.
13. Device as in clause 12, wherein the decryption module and the re-encryption module are included in a secured hardware environment comprised in the device.
14. Device as in clause 12 or 13, comprising a plurality of decryption modules and/or a plurality of re-encryption modules.

The invention claimed is:

1. A method of operating a device for forwarding protected content to at least one client unit, the device comprising at least one decryption module for decrypting the protected content received in the device and a plurality of re-encryption modules for re-encrypting the decrypted protected content to generate re-encrypted protected content to be sent to the client unit, the method comprising:
receiving in the at least one decryption module verification data for one or more selected re-encryption modules of the plurality of re-encryption modules and storing the verification data in the at least one decryption module, the verification data being provided by a provider server;
receiving the protected content in the at least one decryption module;
decrypting the protected content in the at least one decryption module;
receiving in the device an instruction to forward the protected content to the at least one client unit in re-encrypted form, the instruction specifying one of the selected re-encryption modules to be utilized for re-encrypting the protected content;
the re-encryption module specified in the instruction transmitting authentication data to the at least one decryption module;
the at least one decryption module authenticating the re-encryption module specified in the instruction by validating the authentication data using the verification data for the re-encryption module specified in the instruction, which verification data is stored in the at least one decryption module;
only upon having successfully authenticated the re-encryption module specified in the instruction, forwarding the decrypted protected content from the decryption module to the re-encryption module specified in the instruction;
re-encrypting the decrypted protected content in the re-encryption module specified in the instruction; and
forwarding the re-encrypted protected content from the re-encryption module specified in the instruction to the at least one client unit.

2. The method according to claim 1, wherein the verification data are included in verification information and/or are validated using the verification information, the verification information being provided to the decryption module by a content provider server linked to the decryption module.

3. The method according to claim 1, wherein the authentication data of the re-encryption module are included in and/or are determined from authentication information, the authentication information being provided by a management server linked to the re-encryption module.

4. The method according to claim 2, wherein the link between the decryption module and the content provider server is established in a predetermined initialization procedure including a communication between the server and the device.

5. The method according to claim 3, wherein the link between the re-encryption module and the management server is established in a predetermined initialization procedure including a communication between the management server and the device.

6. The method according to claim 4, wherein the initialization procedure comprises transmitting from the content provider server to the device a credential assigned to the content provider server and storing the credential in the decryption module.

7. The method according to claim 5, wherein the initialization procedure comprises transmitting from the management server to the device a credential assigned to the management server and storing the credential in the re-encryption module.

8. The method according to claim 6, wherein the credential is stored in the decryption module upon a successful validation of the credential using a digital certificate stored in the device.

9. The method according to claim 7, wherein the credential is stored in the re-encryption module upon a successful validation of the credential using a digital certificate stored in the device.

10. The method according to claim 3, wherein the re-encryption module generates the authentication data from a credential assigned to the management server and a device identification read from a predetermined memory of the device, the decryption module validating the authentication data using a copy of the credential and the device identification read from the same memory.

11. The method according to claim 1, wherein the authentication data of the re-encryption module include an identification number or a hash value thereof, and wherein the same identification information is included in the verification data provided to the decryption module.

12. The method according to claim 3, wherein re-encryption module generates the identification number using at least two data elements included in the authentication information transmitted to the re-encryption module by the management server.

13. The method according to claim 3, wherein the re-encryption module generates the authentication data by digitally signing challenge information received from the decryption module using a first cryptographic key received from the management server, and wherein the decryption module verifies the digital signature using a second cryptographic key.

14. A device for forwarding protected content to at least one client unit, the device comprising:
  at least one decryption module for decrypting the protected content received in the device; and
  a plurality of re-encryption modules for re-encrypting the decrypted protected content to generate re-encrypted protected content to be sent to the at least one client unit,
  wherein the at least one decryption module is configured to receive and store verification data for one or more selected re-encryption modules of the plurality of re-encryption modules, the verification data being provide by a provider server,
  wherein the device is configured to receive an instruction to forward the protected content to the at least one client unit in re-encrypted form, the instruction specifying one of the selected re-encryption modules to be utilized for re-encrypting the protected content,
  wherein the re-encryption module specified in the instruction is configured to transmit authentication data to the at least one decryption module, and
  wherein the at least one decryption module is further configured to
    receive the protected content and decrypt the protected content,
    authenticate the re-encryption module specified in the instruction by validating the authentication data using the verification data for the re-encryption module specified in the instruction, which verification data is stored in the at least one decryption module, and
    forward the decrypted protected content to the re-encryption module specified in the instruction only upon having successfully authenticated the re-encryption module specified in the instruction.

15. The device according to claim 14, wherein the decryption module and the re-encryption modules are included in a secured hardware environment comprised in the device.

16. The device according to claim 14, comprising a plurality of decryption modules.

17. The device according to claim 15, comprising a plurality of decryption modules.

* * * * *